United States Patent [19]

Haderer

[11] Patent Number: 4,552,988

[45] Date of Patent: Nov. 12, 1985

[54] STRIPPABLE INSULATED WIRE AND METHOD OF MAKING SAME

[75] Inventor: Norman G. Haderer, Briston, Va.

[73] Assignee: Westinghouse Electric Corp., Pittsburgh, Pa.

[21] Appl. No.: 588,423

[22] Filed: Mar. 12, 1984

[51] Int. Cl.[4] ........................ H02G 15/02; H01B 7/00; H01B 13/00

[52] U.S. Cl. .................................... 174/74 R; 156/54; 156/56; 156/289; 174/110 R

[58] Field of Search .......................... 174/74 R, 110 R; 156/54, 56, 289, 344; 427/118; 428/377, 379

[56] References Cited

U.S. PATENT DOCUMENTS

| | | | |
|---|---|---|---|
| 3,087,007 | 4/1963 | Jachimowicz | 156/54 X |
| 3,463,871 | 8/1969 | Rogers | 174/120 R |
| 3,546,014 | 12/1970 | Nicodemus | 427/118 |
| 3,962,517 | 6/1976 | Verne | 174/120 SR |

FOREIGN PATENT DOCUMENTS

| | | | |
|---|---|---|---|
| 2453941 | 5/1976 | Fed. Rep. of Germany | 174/117 F |
| 2901289 | 7/1980 | Fed. Rep. of Germany | 174/74 R |
| 1086823 | 10/1967 | United Kingdom | 174/117 F |
| 1437668 | 6/1976 | United Kingdom | 156/54 |

*Primary Examiner*—A. T. Grimley
*Assistant Examiner*—Morris H. Nimmo
*Attorney, Agent, or Firm*—R. D. Fuerle

[57] ABSTRACT

Disclosed is a method of making an insulated wire, the insulation of which can be easily removed from at least one location. The wire is covered at the desired location with a foil which does not adhere to the wire. The entire wire and foil are then covered with insulation. The insulation can be easily stripped from the wire at the location of the foil by cutting into the insulation at that location and peeling it off. Also disclosed is an insulated wire made by this method.

17 Claims, 2 Drawing Figures

STRIPPABLE INSULATED WIRE AND METHOD OF MAKING SAME

BACKGROUND OF THE INVENTION

When an insulated electrical conductor is wired into a circuit it is necessary to strip the insulation off the ends of the conductor. This is often presently accomplished by abrading the insulation with steel brushes. Because this abrasion produces copper and insulation dust, which may contain fiberglass, this method of stripping the ends of the conductors is considered t be a health hazard. Also, the resulting dust may contaminate the electrical apparatus being constructed, and there is a risk of injury from the rapidly rotating steel brushes.

Removing insulation by abrasion could be avoided if the insulation did not adhere to the conductor so that it could be easily cut away. It has been suggested to coat the conductor with various substances which will prevent the insulation from adhering to it. However, some of these substances, such as polytetrafluoroethylene, will not adhere to the insulation. Thus, if the insulation is not removed in a particular area where the polytetrafluoroethylene has been applied, the insulation will be weak in that area and may break off spontaneously and result in an electrical breakdown. Other substances, such as silicone, will contaminate the oils and other compounds which may be used in electrical apparatus.

RELEVANT ART

U.S. Pat. No. 3,463,871 describes a strippable insulated electric wire. The wire is primed with a dispersion of polytetrafluoroethylene in colloidal silica before the insulating layer of polyimide resin is applied.

French Pat. No. 2,363,166 describes coating a wire with castor oil in order to facilitate removal of a polymer insulator.

Japanese Pat. No. 51-24706 describes use of silicone to render wire separable from the insulation around the wire.

U.S. Pat. No. 3,962,517 describes a conductor having two sets of insulating materials on it. Between the sets is a thin intermediate layer. By proper curing the cable core obtained is rendered peelable at the intermediate layer so that a portion of the intermediate layer is left on each portion.

SUMMARY OF THE INVENTION

I have discovered a method of making an insulated conductor, the insulation of which can be easily removed from a predetermined portion of the conductor. This is accomplished by covering a portion of the conductor with a foil which does not adhere to the conductor. Cutting into the insulation at that location on the conductor and removing the foil will result in a clean conductor at that location. The method and conductor of this invention have the advantage over prior methods and conductors in that there is no contaminating substance remaining on the wire. It is inexpensive and relatively easy to apply the foil to the wire and good adhesion can usually be obtained between the insulation and the foil. The foil can be applied to the wire while it is moving at any location desired.

DESCRIPTION OF THE INVENTION

Figure 1:
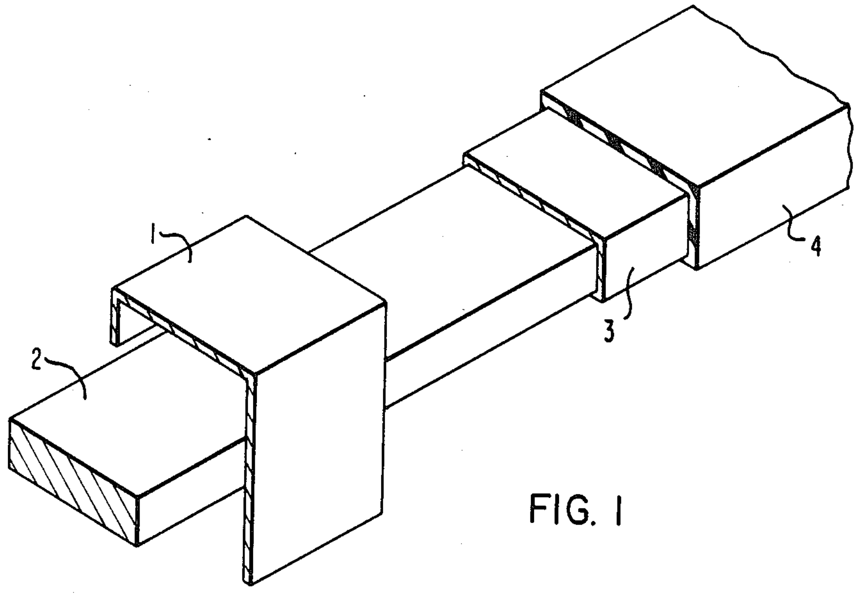
FIG. 1 is an isometric view partially cut away showing a certain presently preferred embodiment of an elongated conductor provided with a foil according to this invention to render it strippable at a particular location.

In FIG. 1, a partially preformed foil 1 is placed over elongated conductor 2, and is wrapped around the conductor as at 3, after which it is covered with insulation 4.

Figure 2:
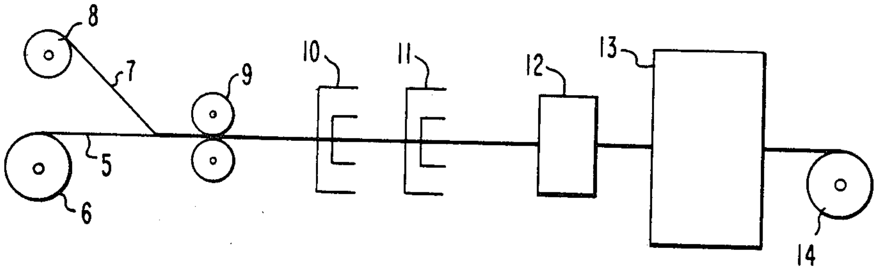
FIG. 2 is a schematic drawing which illustrates a certain presently preferred embodiment of the process of forming a strippable conductor according to this invention.

In FIG. 2, wire 5 from payout 6 is wrapped at predetermined locations with foil 7 from payout 8. Straightening rollers 9 form the foil around the wire. The wire and foil are then insulated with counter rotating filament applicators 10 and 11. A varnish is applied at applicator 12 which is cured in oven 13 before the wire is taken on to reel 14.

The conductor used in this invention can be of any size, shape, or material, though copper and aluminum are the most common metals used. The invention is particularly directed at rectangular copper magnet wire. This wire is commonly cut into predetermined lengths and the ends are stripped off for connection to an electrical apparatus.

The foil can be of almost any material including metals, high temperature plastics, fiberglass reinforced tapes, or other materials. Metals such as aluminum, copper, lead, or tin are preferred as they are the easiest to work with, and aluminum is the most preferred metal because it is thin, inexpensive, and forms well around rectangular wires. The foil must be able to withstand whatever temperatures are required to cure the insulation. The foil also must not adhere to the conductor as it is an object of this invention to leave clean metal when the wire is stripped. It is preferable, however, that the foil and the insulation adhere to each other as that aids in the removal of the insulation in that it comes off easily in large pieces. Of course, the foil must remain on the wire until the insulation is applied even though it does not adhere to the wire. The foil is of such a size and shape that it covers only a small section of the wire, preferably only about 6 to about 18 inches, and it is not applied continuously over the entire wire. It must, however, cover the entire circumference of the wire at the portion where it is applied. It is preferable that the foil be as thin as possible to avoid difficulties in processing a larger diameter section of wire, and to avoid waste of the foil material.

Any type of insulation may be applied over the conductor and the foil, including glass, polyethylene terephthalate, nylons, polyimides, and other types of materials. The insulation can be applied as a tape, filament, or enamel, and it can be applied by wrapping, dipping, or other method.

To construct a strippable conductor according to this invention the locations on the conductor which are to be made strippable are first determined. This can be done, for example, by means of a footmeter which measures the length of wire as it is moving past the foil applicator. At the desired locations the foil is applied to the wire. This may be accomplished by hand wrapping the foil over the wire or it can be done automatically. The foil can be formed in place over the wire or it can be partially preformed as shown in FIG. 1. If the wire is continuously moving, the application of the foil to the wire can be made without stopping the wire. The foil is snugly wrapped around the wire, preferably overlapping slightly to prevent any of the insulation from contacting the wire at that location. The insulation is then applied over both the conductor, and the foil and is cured for the time and temperature required for the particular insulation used. To strip the conductor, the insulation is cut longitudinally at the location of the foil and the foil and insulation are peeled away from the conductor. The location of the foil on the conductor is easily determined by the slight increase in the diameter of the insulated conductor and by a slight alteration in the color of the insulation. If the insulated conductor is to be cut, it can be cut at about the center of the location of the foil so that both wire ends can be stripped.

The following example further illustrates this invention.

EXAMPLE

A 5 mil thick aluminum foil 1 inch wide and 1 foot long was snugly formed around a 0.129×0.362 inch rectangular copper wire moving at 25 feet per minute. After the wire passed through straightening rollers, 18 strands of 450 denier glass yarn twisted with 70 denier polyethylene terephthalate filaments were applied around the conductor and the aluminum foil. This was followed by another 18 strands of the same yarn in the opposite directions. The wire then made 4 passes through an epoxy varnish and an 800° F. oven which cured the epoxy resin. After cooling, the location of the aluminum foil on the wire was easily determined by its greater diameter and slight color change. The insulation at this location was cut longitudinally with a safety razor. The insulation broke off easily and there was no insulation remaining on the bare copper wire.

I claim:

1. A method of making an insulated single conductor, the insulation of which can be easily removed from at least one predetermined location, comprising (A) covering the entire circumference of a bare conductor only at each predetermined location with a metal foil that does not adhere to said conductor; and (B) completely covering said conductor and said metal foil with said insulation.

2. A method according to claim 1 wherein said foil is aluminum.

3. A method according to claim 1 wherein said foil and said insulation adhere to each other.

4. A method according to claim 1 wherein said foil is partly preformed in the shape of said wire prior to its application thereto.

5. A method according to claim 1 wherein said conductor is rectangular.

6. A method according to claim 1 wherein said insulation is applied by wrapping of dipping.

7. In a process of continuously insulating a single wire, where insulation is applied to a bare wire, a method of making said insulation easily strippable only at predetermined locations, comprising prior to applying insulation completely over a single wire, enclosing the entire circumference of said wire only at predetermined locations with a metal foil that does not adhere to said wire.

8. A method according to claim 7 wherein said foil is aluminum.

9. A method according to claim 7 wherein said foil and said insulation adhere to each other.

10. A method according to claim 7 wherein said foil is partly preformed in the shape of said wire prior to its application thereto.

11. A method according to claim 7 wherein said wire is rectangular.

12. A method according to claim 7 wherein said insulation is applied by wrapping or dipping.

13. An insulated wire that can be easily stripped only at predetermined locations along its length comprising (A) a single bare wire;

(B) a metal foil that does not adhere to said wire covering the entire circumference of said wire only at said predetermined locations; and (C) insulation that completely covers said foil and said wire.

14. An insulated wire according to claim 13 wherein said foil is aluminum.

15. An insulated wire according to claim 13 wherein said foil and said insulation adhere to each other.

16. An insulated wire according to claim 13 wherein one of said predetermined locations is an end of said wire.

17. An insulated wire according to claim 13 wherein said wire is rectangular.

* * * * *